(12) United States Patent
Prill et al.

(10) Patent No.: US 8,033,917 B2
(45) Date of Patent: Oct. 11, 2011

(54) DRIVE SHAFT ASSEMBLY FOR A DOWNHOLE MOTOR

(75) Inventors: Jonathan Ryan Prill, Edmonton (CA); Mark Louis Voghell, Edmonton (CA)

(73) Assignee: National Oilwell Varco, L.P., Houston, TX (US)

( * ) Notice: Subject to any disclaimer, the term of this patent is extended or adjusted under 35 U.S.C. 154(b) by 334 days.

(21) Appl. No.: 12/336,242

(22) Filed: Dec. 16, 2008

(65) Prior Publication Data
US 2009/0275415 A1    Nov. 5, 2009

Related U.S. Application Data

(60) Provisional application No. 61/049,315, filed on Apr. 30, 2008.

(51) Int. Cl.
*F16D 3/20* (2006.01)

(52) U.S. Cl. ......... 464/18; 464/115; 464/120; 464/152; 464/155; 29/428

(58) Field of Classification Search .................... 464/18, 464/19, 115, 116, 120, 151, 152, 155; 173/320; 29/428
See application file for complete search history.

(56) References Cited

U.S. PATENT DOCUMENTS

| | | |
|---|---|---|
| 899,913 A | 9/1908 | Shaw |
| 1,311,679 A | 7/1919 | Chalifoux |
| 1,732,354 A | 10/1929 | Cooper |
| 1,838,310 A | 12/1931 | Hubbel |
| 2,140,295 A | 12/1938 | Mallard |
| 2,402,238 A | 6/1946 | Carpenter |

(Continued)

FOREIGN PATENT DOCUMENTS

CA    1290952    10/1991
(Continued)

OTHER PUBLICATIONS

International Preliminary Report on Patentability, The International Bureau of WIPO, Athina Nickitas-Etienne (Authorized Officer), Application No. PCT/CA2008/002193, Nov. 11, 2010 (5 pp).

*Primary Examiner* — Gregory Binda
(74) *Attorney, Agent, or Firm* — Conley Rose, P.C.

(57) ABSTRACT

A drive shaft assembly for a downhole motor includes a drive shaft formed with convexly spherical bearing surfaces on each end, and end housings with concavely spherical bearing surfaces for mating contact with the spherical bearing surfaces of the drive shaft, thereby facilitating omni-directional articulation between the drive shaft and the end housings while transferring axial thrust loads between the drive shaft and end housings across the interface of the mating spherical bearing surfaces. Torque is transferred between the drive shaft and end housings through two or alternatively four swivelling drive keys mounted to each end of the drive shaft and engageable with complementary drive key slots in the end housings. Full and constant torque-transferring contact is thus provided between the swivelling drive keys and the end housings irrespective of any angular offset between the drive shaft and the end housings, resulting from omni-directional articulation of the drive shaft relative to the end housing. The omni-directional center of rotation at each end of the drive shaft coincides with the geometric centerpoint of the corresponding convexly spherical bearing surface, which corresponds to the intersection of the drive shaft's rotational axis, the end housing's rotational axis, and the drive key swivel axis.

14 Claims, 8 Drawing Sheets

U.S. PATENT DOCUMENTS

| | | |
|---|---|---|
| 2,938,710 A | 5/1960 | Tannehill |
| 3,260,069 A | 7/1966 | Neilson et al. |
| 3,359,757 A | 12/1967 | Adams |
| 3,733,853 A | 5/1973 | Sutliff et al. |
| 4,636,180 A * | 1/1987 | Runkle .................. 464/120 |
| 4,772,246 A | 9/1988 | Wenzel |
| 4,904,228 A | 2/1990 | Frear et al. |
| 4,982,801 A | 1/1991 | Zitka et al. |
| 5,000,723 A | 3/1991 | Livingstone |
| 5,048,622 A | 9/1991 | Ide |
| 5,078,650 A | 1/1992 | Foote |
| 5,092,821 A * | 3/1992 | Gilbert et al. ................ 464/152 |
| 5,267,905 A | 12/1993 | Wenzel et al. |
| 5,288,271 A | 2/1994 | Nelson et al. |
| 5,503,235 A | 4/1996 | Falgout, Sr. |
| 5,527,220 A | 6/1996 | Geczy |
| 5,704,838 A | 1/1998 | Teale |
| 6,203,435 B1 | 3/2001 | Falgout, Sr. |
| 7,186,182 B2 | 3/2007 | Wenzel et al. |

FOREIGN PATENT DOCUMENTS

| | | |
|---|---|---|
| CA | 2023042 | 4/1994 |
| CA | 2032042 | 11/1994 |
| CA | 2541339 | 9/2007 |
| DE | 697 253 | * 10/1940 |
| SU | 1135509 A | * 1/1985 |

* cited by examiner

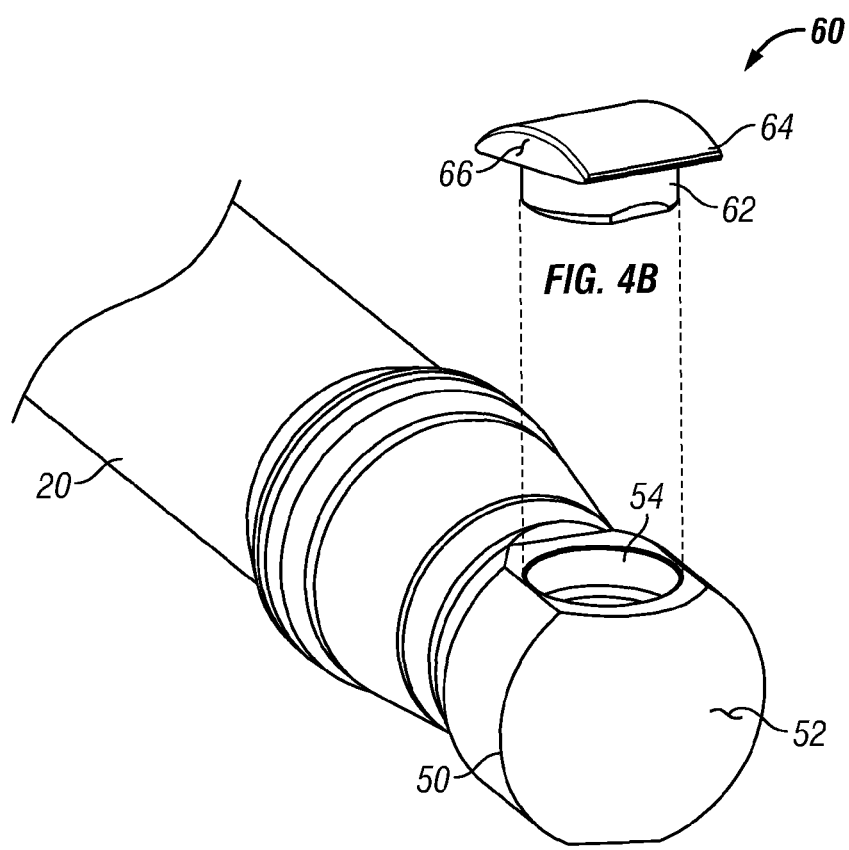
FIG. 4B
FIG. 4A
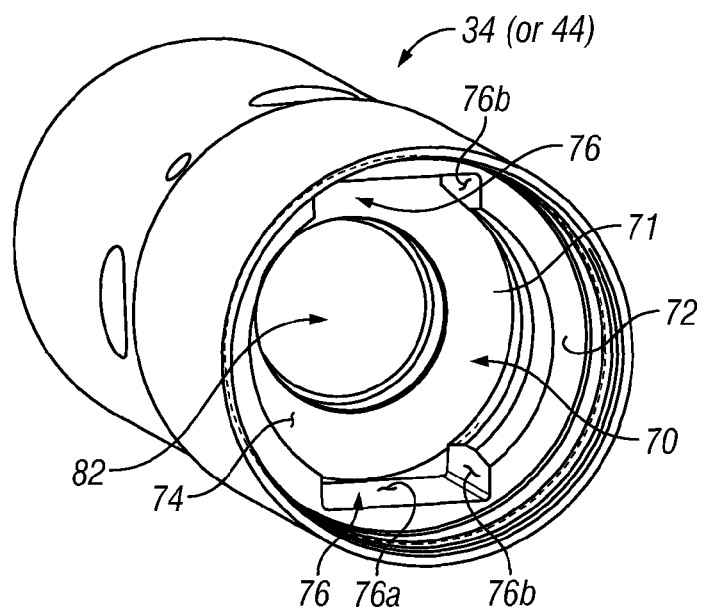
FIG. 5

DRIVE SHAFT ASSEMBLY FOR A DOWNHOLE MOTOR

CROSS-REFERENCE TO RELATED APPLICATIONS

This application claims the benefit, pursuant to 35 U.S.C. 119(e), of U.S. Provisional Application No. 61/049,315, filed on Apr. 30, 2008, and said provisional application is incorporated herein by reference in its entirety.

FIELD OF THE INVENTION

The present invention relates in general to universal joints for transmitting torque between rotating shafts having intersecting but non-coincident rotational axes. More particularly, the invention relates to universal joints for drive shafts associated with downhole motors used in the oil and gas industry for drilling boreholes, especially in applications requiring transfer of large torque and axial thrust loads across the joint.

BACKGROUND OF THE INVENTION

In drilling a borehole (or wellbore) into the earth, such as for the recovery of hydrocarbons or minerals from a subsurface formation, it is conventional practice to connect a drill bit onto the lower end of an assembly of drill pipe sections connected end-to-end (commonly referred to as a "drill string"), and then rotate the drill string so that the drill bit progresses downward into the earth to create the desired borehole. In addition to drill pipe sections, the drill string for non-horizontal drilling operations typically incorporates heavier tubular members below the pipe sections known as heavyweight pipe or drill collars, disposed near the end of the drill string above the drill bit to increase the vertical load on the drill bit and thus enhance the bit's operational effectiveness. Other accessories commonly incorporated into drill strings include stabilizers to assist in maintaining the desired direction of the drilled borehole, and reamers to ensure that the drilled borehole is maintained at a desired gauge (i.e., diameter). In conventional vertical borehole drilling operations, the drill string and bit are rotated by means of either a "rotary table" or a "top drive" associated with a drilling rig erected at the ground surface over the borehole (or in offshore drilling operations, on a seabed-supported drilling platform or suitably-adapted floating vessel).

During the drilling process, a drilling fluid (also commonly referred to in the industry as "drilling mud", or simply "mud") is pumped under pressure downward from the surface through the drill string, out the drill bit into the borehole, and then upward back to the surface through the annular space between the drill string and the wellbore. The drilling fluid, which may be water-based or oil-based, is typically viscous to enhance its ability to carry borehole cuttings to the surface. The drilling fluid can perform various other valuable functions, including enhancement of drill bit performance (e.g., by ejection of fluid under pressure through ports in the drill bit, creating mud jets that blast into and weaken the underlying formation in advance of the drill bit), drill bit cooling, and formation of a protective cake on the borehole wall (to stabilize and seal the borehole wall).

Particularly since the mid-1980s, it has become increasingly common and desirable in the oil and gas industry to drill horizontal and other non-vertical boreholes (i.e., "directional drilling"), to facilitate more efficient access to and production from larger regions of subsurface hydrocarbon-bearing formations than would be possible using only vertical boreholes.

In directional drilling, specialized drill string components and "bottom hole assemblies" are used to induce, monitor, and control deviations in the path of the drill bit, so as to produce a borehole of desired non-vertical configuration.

Directional drilling is typically carried out using a "downhole motor" (alternatively referred to as a "drilling motor" or "mud motor") incorporated into the drill siring immediately above the drill bit. A typical downhole motor includes several primary components, as follows (in order, starting from the top of the motor assembly):

- a top sub adapted to facilitate connection to the lower end of a drill string ("sub" being the common general term in the oil and gas industry for any small or secondary drill string component);
- a power section;
- a drive shaft enclosed within a drive shaft housing, with the upper end of the drive shaft being operably connected to the rotor of the power section; and
- a bearing assembly (which includes a mandrel with an upper end coupled to the lower end of the drive shaft, plus a lower end adapted to receive a drill bit).

In drilling processes using a downhole motor, drilling fluid is circulated under pressure through the drill string and back up to the surface as in conventional drilling methods. As will be described in greater detail below, however, the pressurized drilling fluid exiting the lower end of the drill pipe is diverted through the power section of the downhole motor to generate power to rotate the drill bit.

The main components of the power section are an elongate and generally cylindrical stator disposed within a tubular stator housing, and an elongate rotor member rotatable within the stator. The power section in the most common type of downhole motor is a "positive displacement" power section, which is essentially similar to the progressive cavity (or "Moineau") pump well known in the art, but operating in reverse. The rotor comprises a shaft formed with one or more helical vanes or lobes encircling the shaft and extending along its length. The stator is typically in the form of an elastomer lining bonded to the inner cylindrical wall of the stator housing, and defines helical lobes of a configuration complementary to that of the rotor lobe or lobes, but numbering one more than the number of rotor lobes. The lower end of the rotor comprises or is connected to an output shaft which is in turn connected to the upper end of the drive shaft.

During operation of the downhole motor, high-pressure drilling fluid is forced through the power section, causing the rotor to rotate within the stator, and inducing a pressure drop across the power section (i.e., the drilling fluid pressure being lower at the bottom of the power section). The power thus delivered to the rotor output shaft is proportional to the product of the volume of fluid passing through the power section multiplied by (the pressure drop across the power section (i.e., from fluid inlet to fluid outlet). Accordingly, a higher rate of fluid circulation fluid through the power section will result in a higher rotational speed of the rotor within the stator, and correspondingly higher power output.

As previously noted, the output shaft of the power section rotor is coupled to the upper end of the drive shaft, for transmission of rotational torque to turn the drill bit. However, the motion of the rotor in a positive displacement-type downhole motor (or "PD motor") is eccentric in nature, or "precessional"—i.e., in operation, the lower end of the rotor (i.e., the output end) rotates about the centroidal longitudinal axis of the stator housing, such that the longitudinal axis of the rotor rotates in an eccentric motion about the stator axis, defining a conical surface of rotation.

In an alternative type of power section for a downhole motor, the rotor and stator of a power section incorporate turbine blading, with the stator comprising stationary blade sections fixed within and to the tubular stator housing, and with rotor blade sections fixed onto a rotor shaft. Drilling fluid is forced through the stator under pressure, inducing rotation of the rotor within the stator. In this turbine-type power section, the rotor axis remains coincident with the axis of the stator, so there is no eccentric or precessional motion as in the case of a PD motor power section, and the rotational speed is much higher. Although a turbine-type power section does not have the same characteristics as a PD motor power section, it performs the same basic function (i.e., to produce rotational power to turn the drill bit) by essentially similar means (i.e., rotor rotation induced by passage of pressurized drilling fluid through the stator).

Irrespective of the particular type of power section used in the downhole motor, the lower or output shaft of the rotor is operationally coupled to the upper end of the drive shaft by means of a first (or upper) universal joint, whereby rotational torque can be transferred from the rotor to the drive shaft irrespective of the fact that the rotor and drive shaft axes may be non-coincident as necessary for purposes of directional drilling (as well as due to the rotor's eccentric rotation in the case of a PD motor power section). When a turbine power section is employed, and the drive shaft housing is a solid, one-piece housing with no bend, a universal joint is not required.

The bearing assembly typically incorporates an elongate tubular mandrel having an upper end which is operationally coupled to the lower end of the drive shaft by means of a second (or lower) universal joint, and a lower end to which a drill bit may be mounted. The mandrel is encased in a tubular bearing housing that connects to the tubular drive shall housing above. The mandrel rotates non-eccentrically within the bearing housing. As the other components and construction details of the typical bearing assembly are not pertinent to the present invention, they will not be discussed further herein; however, they will be well known and understood by persons of ordinary skill in the art of the invention.

In operation, the drive shaft and power section rotor in a downhole motor are subjected to high axial compression loads as the drill bit bores into subsurface formations to create a borehole. The magnitude of these compressive loads will vary with the power generated by the downhole motor, which as previously discussed is proportional to the pressure drop across the power section. To accommodate these compressive loads, a thrust bearing of some type is typically incorporated into the universal joint assemblies at each end of the drive shaft.

The transverse dimensions of a universal joint for a downhole motor drive shaft are inherently constrained by the internal diameter of the drive shaft housing. Therefore, a drive shaft universal joint must incorporate sufficient structure for effective transfer of in-service torque and thrust loads, while being sufficiently compact in size to prevent physical interference with the drive shaft housing due to "wobbling" or precessional movement of the output end of the power section rotor. Accordingly, the inner diameter of (the drive shaft housing constitutes a fixed design constraint when it is desired to increase the torque and/or thrust capacity of a drive shaft universal joint, or to increase the fatigue strength or service life of a universal joint for given torque and thrust loads.

The prior art discloses numerous examples of universal joints for use in association with downhole motor drive shafts. For example, Canadian Patent No. 1,290,952 (Wenzel) and corresponding U.S. Pat. No. 4,772,246 disclose a drive shaft universal joint that uses four articulating drive keys having cylindrical shanks swivellably disposed within corresponding radial sockets in the side of the drive shaft. Each drive key has a head portion slidingly disposed within a longitudinal slot in an end housing surrounding the joint, with a pair of opposed planar side surfaces in sliding contact with planar sidewalls of the longitudinal slot, for transferring torque to the end housing. The heads of the drive keys will slide within their corresponding slots in the housing in response to any angular deviation between the axes of the drive shaft and the end housing, with all four drive keys remaining-in contact with the slot sidewalls for transfer of torque. A spherical ball bearing serving as a thrust bearing is placed on a bearing scat centrally located within the central shaft, and with the axes of the drive key shanks passing through the center of the thrust bearing.

Canadian Patent No. 2,023,042 (Wenzel et al.), and corresponding U.S. Pat. No. 5,267,905 disclose a drive shaft universal joint that transfers torque by means of ball bearings each disposed partially within a hemispherical pocket in the side of the drive shaft and partially within a semi-cylindrical longitudinal slot in an end housing surrounding the joint. The ball bearings are equally spaced in a circular pattern around the drive shaft, lying in a plane perpendicularly transverse to the axis of the drive shaft. The universal joint further includes a ball thrust bearing centrally positioned within the drive shall, with the center of the thrust bearing aligned with the centers of the ball bearings.

In the universal joint of CA 2,032,042, the only time all of the ball bearings are effectively engaged for transferring torque is when the longitudinal axes of the end housing and the drive shaft are coincident, a condition that never exists in a PD motor due to the precessional motion of the power section output shaft as previously discussed. Whenever there is a relative angular deviation between the axes of the power section rotor and the drive shaft, there will be at most two (diametrically-opposed) torque-transmitting balls fully engaged for effective torque transfer. This is because the angular deviation causes the balls to define an ellipse rather than a circle when viewed along the axis of the end housing. Accordingly, some of the balls will be displaced radially inward, out of their slots in the end housing, in response to any angular deviation between the rotor and drive shaft axes, such that only those balls disposed at or near the larger diameter of the ellipse will be in fully effective engagement with their corresponding slots in the end housing. In addition to the resultant inefficiency of torque transfer, the lack of constant engaging contact between the drive balls and the housing increases shock loading on the assembly, inducing fatigue stresses lending to shorten the service life of the universal joint.

U.S. Pat. No. 5,704,838 (Teale) teaches a further example of a drive shaft universal joint that uses ball bearings as a torque transfer means. As in CA 2,023,042, however, the Teale U-joint it has the drawback that only two torque-transmitting balls will be fully effective for torque transfer at any given time whenever the axes of the connecting shafts are not coincident.

Additional examples of prior art universal joints may be found in the following:

Canadian Patent Application No. 2,541,339 (Johnson et al.);
U.S. Pat. No. 4.904,228 (Frear et al.);
U.S. Pat. No. 4,982,801 (Zitka et al.);
U.S. Pat. No. 5,000,723 (Livingstone);
U.S. Pat. No. 5,048,622 (Ide);
U.S. Pat. No. 5,078,650 (Foote);

U.S. Pat. No. 5,288,271 (Nelson et al.); and

U.S. Pat. No. 7,186,182 (Wenzel et al.).

The prior art universal joints fail to address several significant problems, the first of which is non-uniform and inefficient torque transfer in U-joints using circularly-arrayed torque-transfer elements such as the torque-transfer balls in CA 2,032,042 and U.S. Pat. No. 5,704,838, as discussed above. This problem does not occur in the U-joint of CA 1,290,952 (and U.S. Pat. No. 4,772,246), which incorporates drive keys that remain in sliding-fit contact with corresponding end housing slots in response to angular deviations between the drive shaft and the end housing axes. However, all of the prior art U-joints, including the U-joint of CA 1,290,952, are limited in their torque-transfer capacity by both the available shear strength of their torque-transfer elements (e.g., drive balls or drive keys) and the effective contact area available for transferring torque-induced forces between the torque transfer elements and their corresponding resistive elements (e.g., pockets or slots in drive shafts or end housings). Such torque-transfer limitations severely restrict the suitability and serviceability of known U-joints for use with higher-power PD motors that are now available in the market.

A further problem arises with known U-joints of the type that uses a spherical thrust bearing centrally disposed between the drive shaft and the end housing, as in CA 1,290,952, CA 2,032,042, CA 2,541,339, and U.S. Pat. No. 5,704,838. Modern PD motor power sections are capable of producing higher power—and therefore higher torque and higher thrust loads—without increasing the overall motor diameter. Known U-joint designs cannot be readily adapted to withstand the higher thrust loads associated with newer high-power, high-torque PD power sections because the size of the spherical thrust bearing is constrained by the diameter of permissible drive shaft U-joints.

For the foregoing reasons, there is a need for an improved PD motor drive shaft and universal joint assembly that can withstand both higher torque loads and higher axial thrust loads than known universal joint assemblies, without necessitating an increase in the diameter of the overall universal joint assembly, and while ensuring uniform transfer of torque forces irrespective of angular deviations between the axes of the drive shaft and the drive shaft end housing. The present invention is directed to these needs.

BRIEF SUMMARY OF THE INVENTION

In general terms, the apparatus of present invention is a drive shaft assembly, particularly but not exclusively suitable for incorporation into a downhole motor, incorporating a drive shaft formed with convexly spherical bearing surfaces on each end, plus end housings having concavely spherical bearing surfaces for receiving the spherical bearing surfaces of the drive shaft in slidable mating engagement, thereby facilitating omni-directional articulation between the drive shaft and the end housings while transferring axial thrust loads between the drive shaft and end housings across the spherical bearing interfaces at each end of the assembly. A pair of drive keys are swivellably mounted, in diametric opposition, to each end of the drive shaft, with the swivel axes of each pair of drive keys passing through the geometric centerpoint of the corresponding convexly spherical bearing surface of the drive shaft. The drive keys transmit the loads to the housings through flat contact faces that bear against bearing surfaces in complementary drive key slots formed in the end housings. Full and constant torque-transferring contact is thus provided between the swivelling drive keys and the end housings irrespective of any angular offset between the drive shaft and the end housings.

By incorporating the thrust bearings into the drive shaft itself, on the extreme ends thereof, the present invention makes it unnecessary to provide separate and discrete thrust bearing elements (e.g., ball bearings seated within the ends of the drive shaft) as in prior art universal joint designs. This design feature also makes it possible to provide much larger effective thrust-bearing contact surfaces, thereby increasing the axial thrust load capacity of the drive shaft assembly, without increasing the diameter of the drive shaft's universal joint assembly. Moreover, formation of the thrust bearings on the ends of the drive shaft also makes it possible to provide torque transfer elements having considerably larger effective contact surfaces, thereby increasing the torque load capacity of the drive shaft assembly, without increasing the diameter of the overall drive shaft assembly.

Accordingly, in a first aspect the present invention relates to a drive shaft assembly comprising:

(a) a drive shaft having a first end, a second end, and a longitudinal rotational axis, said first end being formed with an integral, convexly spherical bearing surface;

(b) a first end housing having a longitudinal rotational axis, and having a concavely spherical bearing surface configured for slidable mating engagement with the convexly spherical bearing surface of the first end of the drive shaft;

(c) means for transferring torque from the drive shaft to the first end housing when the convex bearing surface of the first end of the drive shaft is in mating engagement with the concave bearing surface of the first end housing, said means for transferring torque being operationally effective irrespective of any relative angular offset between the rotational axes of the drive shaft and the first end housing.

In a particularly preferred embodiment, the drive shaft assembly of the present invention comprises:

(a) a drive shaft having a first end, a second end, and a longitudinal rotational axis, with a first convexly spherical bearing surface being formed on said first end of the drive shaft, and with the geometric centerpoint of said first convexly spherical bearing surface lying on the rotational axis of the drive shaft;

(b) a first pair of primary drive keys, mounted to the first end of the drive shaft on opposite sides thereof and swivellable about a primary swivel axis perpendicular to and passing through the geometric centerpoint of the first convexly spherical bearing surface, with each primary drive key comprising a drive key head projecting outward of the drive shaft; and (c) a first end housing having a longitudinal rotational axis, and having a concavely spherical bearing surface with a geometric centerpoint on the rotational axis of the first end housing, with the radius of said first concavely spherical bearing surface corresponding to the radius of the first convexly spherical bearing surface of the drive shaft;

wherein:

(d) each primary drive key head has a planar primary end face, said planar primary end face being parallel to the primary swivel axis;

(e) the first end housing is configured to receive the first end of the drive shaft with the first convexly spherical bearing surface of the drive shaft in slidable mating engagement with the concavely spherical bearing surface of the first end housing;

(f) the first end housing has a first pair of primary drive key slots positioned and configured to receive the primary drive key heads when the first convexly spherical bearing surface of the drive shaft is in mating engagement with the concavely spherical bearing surface of the first end housing;

(g) each primary drive key slot includes a planar primary side face, said primary side face being parallel to the rotational axis of the first end housing; and (h) the length of each primary drive key slot in the direction of the rotational axis of the first end housing is greater than the length of the corresponding primary drive key head, such that each primary drive key head is slidable within its corresponding primary drive key slot;

such that:

(i) the drive shaft can be omnidirectionally articulated relative to the first end housing;

(j) rotation of the drive shaft in a first rotational direction will urge the primary end faces of the primary drive key heads into force-transferring contact against the primary side faces of the corresponding primary drive key slots, thereby transferring rotational torque between the drive shaft and the first end housing, with each primary drive key head being slidable within its corresponding primary drive key slot to accommodate angular variances between the longitudinal axes of the drive shaft and the first end housing, within a selected angular range; and (k) axial thrust forces will be transferred between the drive shall and the first end housing across the interface between the first convexly spherical bearing surface of the driveshaft and the concavely spherical bearing surface of the first end housing, irrespective of angular variances between the rotational axes of the drive shaft and the first end housing, within a selected angular range.

In preferred embodiments, the means for transferring torque comprises a pair of drive keys swivellably mounted to on opposite sides of the drive shaft, with drive key heads configured to transfer rotation torque forces by engagement with corresponding drive key slots in the first end housing. Alternative embodiments may include a second pair of such drive keys, oriented at right angles to the first pair of drive keys. Further alternative embodiments may use torque-transfer means as in accordance with prior art universal joints, such as a plurality of spherical torque-transfer elements as taught, for instance, in CA 2,032,042 and U.S. Pat. No. 5,267,905.

The convexly spherical bearing surface of the first end housing may be machined directly into the parent material of first end housing. In preferred embodiments, however, the convexly spherical bearing surface may be provided either wholly or partially in the form of a bearing insert made from bronze, a bronze alloy, polyurethane, or Teflon®, or another suitable friction-reducing material.

In alternative embodiments, the drive shaft assembly further incorporates a second end housing, in association with the second end of the drive shaft, with the second end of the drive shaft and the second end housing having convexly and concavely spherical thrust bearing surfaces, respectively, generally as described with respect to the first end of the drive shaft.

In a second aspect, the present invention is directed to a method for transferring an axial thrust load from an elongate first rotating member to a second rotating member, each rotating member having a rotational axis. In one broad embodiment, this method comprises the steps of:

(a) forming a convexly spherical surface on a first end of the first rotating member, with the geometric centerpoint of said convexly spherical surface lying on the rotational axis of the first rotational member;

(b) forming the second rotating member with a concavely spherical surface, said concavely spherical surface having its geometric centerpoint lying on the rotational axis of the second rotational member and having a radius corresponding to the radius of the convexly spherical surface of the first rotating member;

(c) assembling the first and second rotating members with the convexly spherical surface of the first rotating member in slidably mating engagement with the concavely spherical surface of the second rotating member, with the geometric centerpoints of said convexly spherical and concavely spherical surfaces being coincident; and (d) providing means for maintaining said convexly and concavely spherical surfaces in slidably mating engagement irrespective of any angular offset between the rotational axes of the first and second rotational members, within a selected angular range.

The method of the invention may also comprise the further step of providing means for transferring torque from the first rotating member to the second rotating member irrespective of any angular offset between (he rotational axes of the first and second rotational members, within a selected angular range.

BRIEF DESCRIPTION OF THE DRAWINGS

Embodiments of the invention will now be described with reference to the accompanying Figures, in which numerical references denote like parts, and in which:

FIG. 4A is a perspective view of one end of the drive shaft shown in FIGS. 2 and 3, with the end of the drive shaft having a spherical bearing surface.

FIG. 4B is a perspective view of a swivelling drive key adapted for insertion into the drive key slot of the drive shaft shown in FIG. 4B.

FIG. 5 is a perspective view of the end housing shown in FIG. 2, illustrating a thrust bearing seat and drive key slots, for engagement with the drive shaft's spherical bearing surface and drive keys, respectively.

DETAILED DESCRIPTION OF THE PREFERRED EMBODIMENT

Figure 1:
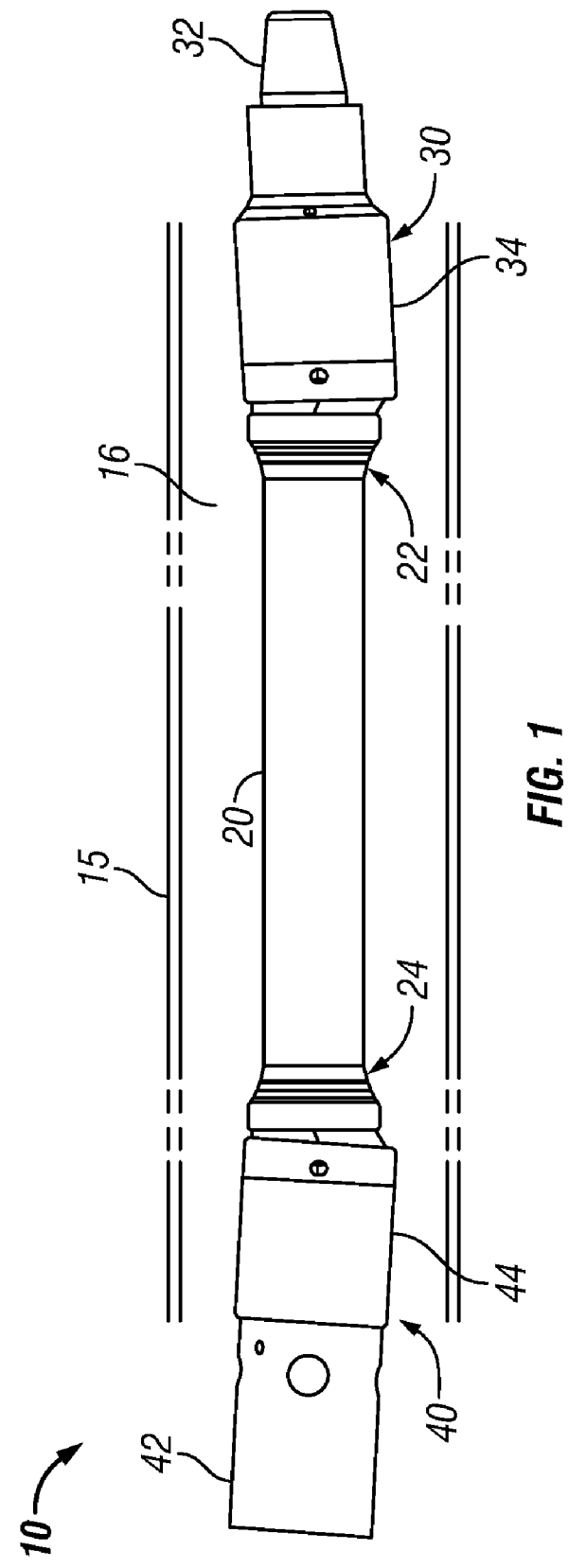
FIG. 1 is a side view of a drive shaft in accordance, with an embodiment of the present invention, with end housings at each end.

Referring to FIG. 1, a drive shaft assembly 10 in accordance with the present invention comprises a drive shaft 20 having an upper end 22 and a lower end 24, an upper end housing 30, and a lower end housing 40. When assembled within a downhole motor, drive shaft assembly 10 will be enclosed within a tubular drive shaft housing conceptually indicated by broken lines 15 in FIG. 1, thereby forming an annular space 16 between drive shaft housing 15 and drive shaft assembly 10.

Upper end housing 30 has a connector section 32, adapted for connection to the output shaft (not shown) of the power section of a downhole motor, and a coaxially contiguous socket section 34, adapted to receive upper end 22 of drive shaft 20 and to accommodate omni-directional rotation of drive shaft 20 therein, while transferring rotational torque and axial thrust loads from the output shaft to drive shaft 20. Lower end housing 40 has a connector section 42, adapted for connection to the mandrel of the bearing section (not shown) of the downhole motor, and a coaxially contiguous socket section 44, adapted to receive lower end 24 of drive shaft 20 and to accommodate omni-directional articulation of drive shaft 20 therein, while transferring rotational torque and axial thrust loads from drive shaft 20 to the mandrel.

As shown in the Figures, connector section 42 of lower end housing 40 defines a connector cavity 46 and one or more mud channels 47 whereby connector cavity 46 will be in fluid communication with annular space 16. As previously described, drilling fluid (or "mud") must be pumped through the drill string and downhole motor and thence to the drill bit. In the illustrated drive shaft assembly 10, drilling fluid moving downward within annular space 16 passes through mud channels 47 and into connector cavity 46, whence it will directed through the bearing section of the downhole motor.

The specific details of the connector sections 32 and 42 are not directly relevant to the present invention. However, socket sections 34 and 44, which constitute essential components of the invention, will typically be substantively similar or identical to each other. Accordingly, the invention can be effectively described and illustrated with reference only to one end housing, as in FIGS. 2, 3, 5, and 6 to 9, which illustrate only lower end 24 of drive shaft 20 connection to lower end housing 40. It is to be understood, however, that the described and illustrated principles and features of the connection of drive shaft 20 to socket section 44 of lower end housing 40 will be equally relevant to the connection of drive shaft 20 to socket section 34 of upper end housing 30.

As illustrated in FIG. 4A, each end of drive shaft 20 has an end section 50 formed with a convexly spherical bearing surface 52 centered about a geometric centerpoint X lying on longitudinal rotational axis A-20 of drive shaft 20. It should be noted that in the context of this patent document, the term "spherical surface" is referable to a surface forming part of the surface of a sphere, not strictly to the complete surface of a sphere. End section 50 is also formed with a pair of cylindrical drive key sockets 54 on opposite sides of end section 50 and centered on a drive key swivel axis A-60 passing through and perpendicular to centerpoint X.

FIG. 4B illustrates an embodiment of a drive key 60 for insertion into one of drive key sockets 54. In the illustrated embodiment, drive key 60 has a cylindrical shank 62 sized and adapted for a tight but swivelling fit within shank socket 54, plus and a drive key head 64 which has opposing planar end bearing faces 66 to facilitate torque transfer between drive shaft 20 and end housing 40 (as explained in greater detail below), said end bearing faces 66 being parallel to each other and parallel to drive key swivel axis A-60. Strictly speaking, however, each drive key head 64 requires only one planar end bearing face 66, to transfer torque resulting from rotation of drive shaft 20 in one direction only.

FIG. 5 illustrates features of socket section 44 of lower end housing 40 (or, alternatively, socket section 34 of upper end housing 30). Lower end housing 40 has a longitudinal rotational axis A-40. Socket section 44 defines a cavity 70 bound by a base wall 71 and a generally cylindrical sidewall 72. Base wall 71 is formed with or incorporates a concavely spherical bearing surface 74 configured for closely mating and rotationally sliding engagement with bearing surface 52 of end section 50 of drive shaft 20. In preferred embodiments, spherical bearing surface 74 is provided either wholly or partially in the form of a bearing insert 80, as illustrated in the Figures and as described in greater detail further on in this patent document. However, bearing surface 74 can alternatively be directly machined into the parent material of base wall 71.

Sidewall 72 of socket section 44 is formed with a pair of opposing drive key slots 76, each drive key slot 76 having an outer face 76A and, in the illustrated embodiments, two opposing planar side bearing faces 76B, parallel to each other and parallel to the longitudinal rotational axis A-40 of lower end housing 40. Drive key slots 76 are located and configured such that each pocket 76 will receive the drive key head 64 of one of drive keys 60, with the end bearing faces 66 of each drive key head 64 in tight but readily slidable contact against the corresponding side bearing faces 76B of drive key slots 76, when end section 50 of drive shaft 20 (with drive keys 60 positioned in drive key sockets 54) is inserted into cavity 70 of socket section 44 so as to bring convex spherical bearing surface 52 of end section 50 into contact with concave spherical bearing surface in base wall 71 of socket section 44. The length of each drive key slot 76 measured parallel to longitudinal rotational axis A-40 of housing 40 is greater than the length of the corresponding drive key head 64 such that each drive key head 64 is slidable disposed within its corresponding drive key slot 76.

Although the drive key slots 76 in the embodiment shown in FIG. 5 have two side bearing faces 76B, and although this arrangement may be convenient for fabrication purposes, it will be appreciated that each drive key slot 76 requires only one side bearing face 76B for purposes of transferring torque resulting from rotation of drive shaft 20 in one direction only.

Referring again to FIGS. 2 and 3, it will be seen that when end section 50 of drive shaft 20 is inserted into cavity 70 as described immediately above, axis A-20 of drive shaft 20, axis A-40 of end housing 40, and drive key swivel axis A-60 will intersect at centerpoint X, irrespective of any relative angular offset θ between axes A-20 and A-40, within a selected angular range consistent with normal operational limits of downhole motors (typically but not necessarily limited to a maximum angular offset θ of three degrees). This coincidence of axes A-20, A-40, and A-60 is beneficial to prevent or inhibit the development of secondary bending moments in end housing 40 and other downhole motor components.

Having reference to FIGS. 6-9, it will also be readily understood that end bearing faces 66 of drive key heads 64 will remain in tight contact against the corresponding side bearing faces 76B of drive key slots 76 irrespective of any angular offset θ (within a selected angular range), as shanks 62 of drive keys 60 will rotate within their respective shank socket 54 in response to such angular offset. As a result, when drive shaft 20 is rotated, the associated torque is transferred to end housing 40 directly, continuously, and without shock loading, irrespective of whether axes A-20 and A-40 are coincident or angularly offset. At the same time, axial thrust loads are transferred directly from drive shaft 20 to end housing 40—irrespective of the angle between axes A-20 and A-40—across the spherical bearing interface between convex spherical bearing surface 52 and concave spherical bearing surface 74, without requiring a separate and discrete spherical thrust bearing as in prior art universal joint assemblies.

It will be readily appreciated that the present invention facilitates the transfer of considerably higher torque and thrust loadings than is possible with prior art drive shaft universal joint assemblies, without increasing the diameter of the drive shaft housing. The invention achieves this highly beneficial result firstly because it integrally incorporates a thrust bearing into each end of the drive shaft, thus eliminating the discrete spherical thrust bearing of prior art U-joints, and making it possible to provide a much larger effective thrust bearing contact area than can be provided with a discrete spherical thrust bearing within the same dimensional constraints. This makes it possible transmission of higher axial thrust loads without increasing thrust bearing contact pressures.

Secondly, the innovative configuration of the drive shaft and the torque-transferring drive keys of the present invention makes it possible to provide a larger total torque-transferring contact surface area (i.e., double the area of one drive key bearing face 66) than in prior art U-joint assemblies. Moreover, the net resultant force components of drive key bearing faces 66 act at a torque arm (i.e., radial distance from axis A-20 to the effective centroid of bearing face 66) significantly greater than the effective torque arm of the torque-transmitting elements of prior art assemblies. This means that the torque transmission contact pressures will be lower for a given torque load, or higher torque loads can be withstood for a given torque transmission contact pressure. The configuration taught by the present invention further facilitates transfer of increased torque loadings because drive key shanks 62 can be readily sized to minimize transverse shear stresses acting thereon, thus eliminating such shear stresses as a potential weakest point in the assembly.

Figure 10:
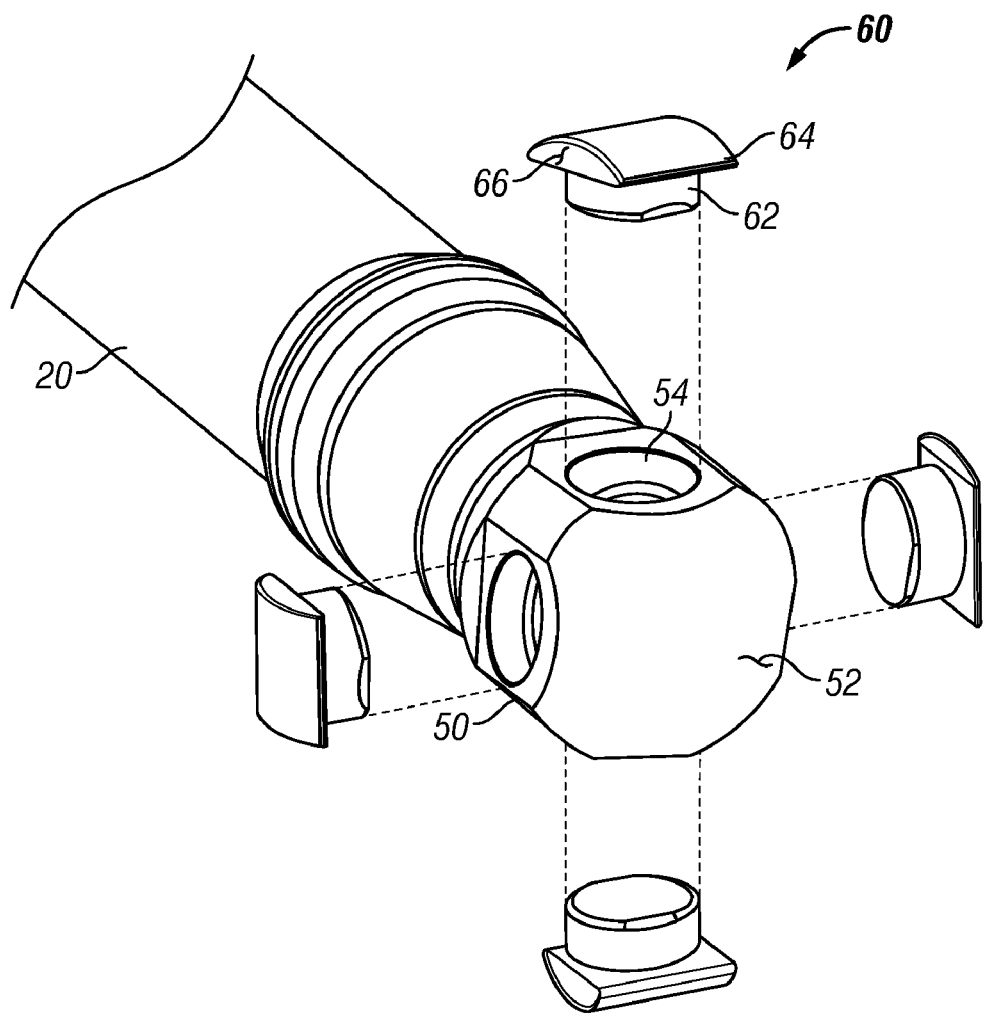
FIG. 10 is a perspective end view of an embodiment of a driveshaft including four drive keys spaced 90° apart.
Figure 11:
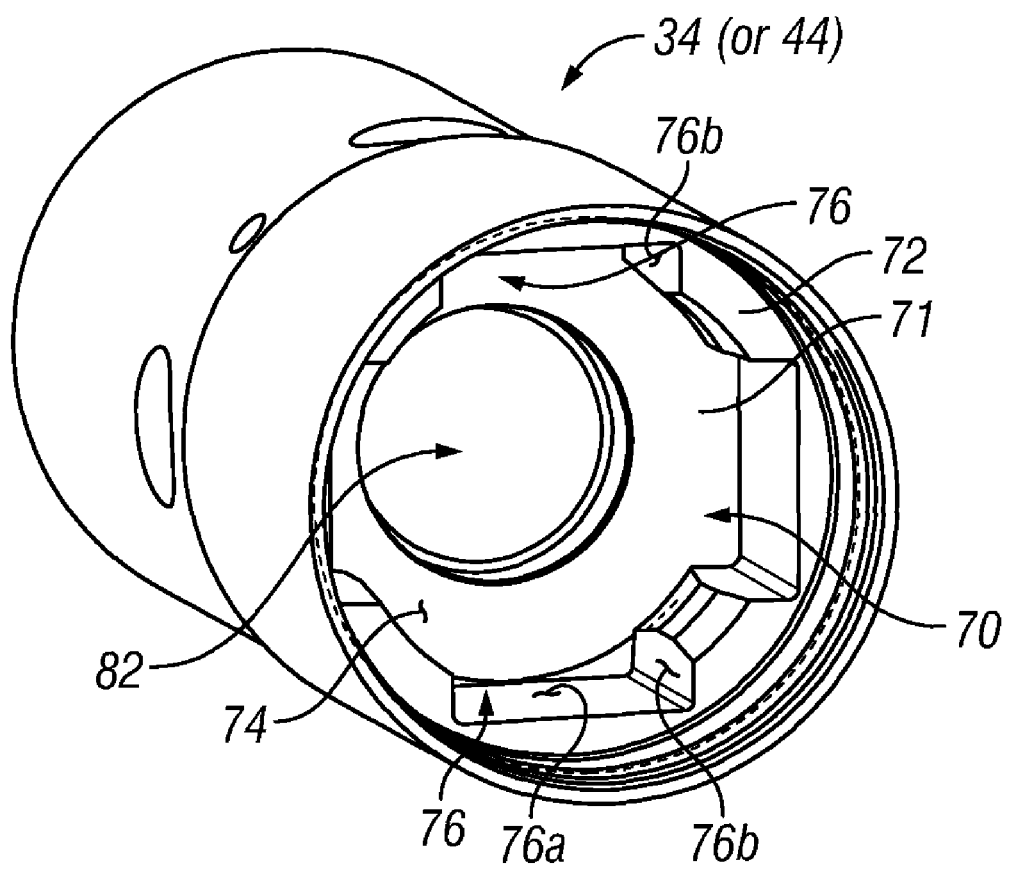
FIG. 11 is a perspective end view of an embodiment of an end housing including four drive key slots spaced 90° apart and sized to slidingly receive the four drive keys of the driveshaft of FIG. 10.

For the foregoing reasons, preferred embodiments will incorporate precisely two drive keys of the type illustrated in the Figures, at either end of the drive shaft. However, persons skilled in the art will readily appreciate that the scope of the present invention is not limited to the use of any particular number or type of torque-transfer elements. For example, as shown in FIGS. 10 and 11, in other embodiments, four drive keys of the illustrated type at each end of the drive shaft, with the swivel axes of each opposing pair of drive keys being at right angles to each other and intersecting at the longitudinal axis of the drive shaft may be employed. It may be readily demonstrated using three-dimensional modelling that in both two-key and four-key variants, the end faces of all drive key heads will remain in effective force-transferring contact with the corresponding side faces of the drive key slots in the end housings, irrespective of any angular between the longitudinal axes of the drive shaft and the end housings.

In alternative though less preferred embodiments, torque transfer may be provided by means of spherical torque-transfer elements as in prior art universal joints. Although torque transfer may be less than optimally effective in such embodiments, for reasons discussed in connection with prior art universal joints, these alternative embodiments will nonetheless incorporate the beneficial features of the thrust bearing construction taught by the present invention.

Figure 2:
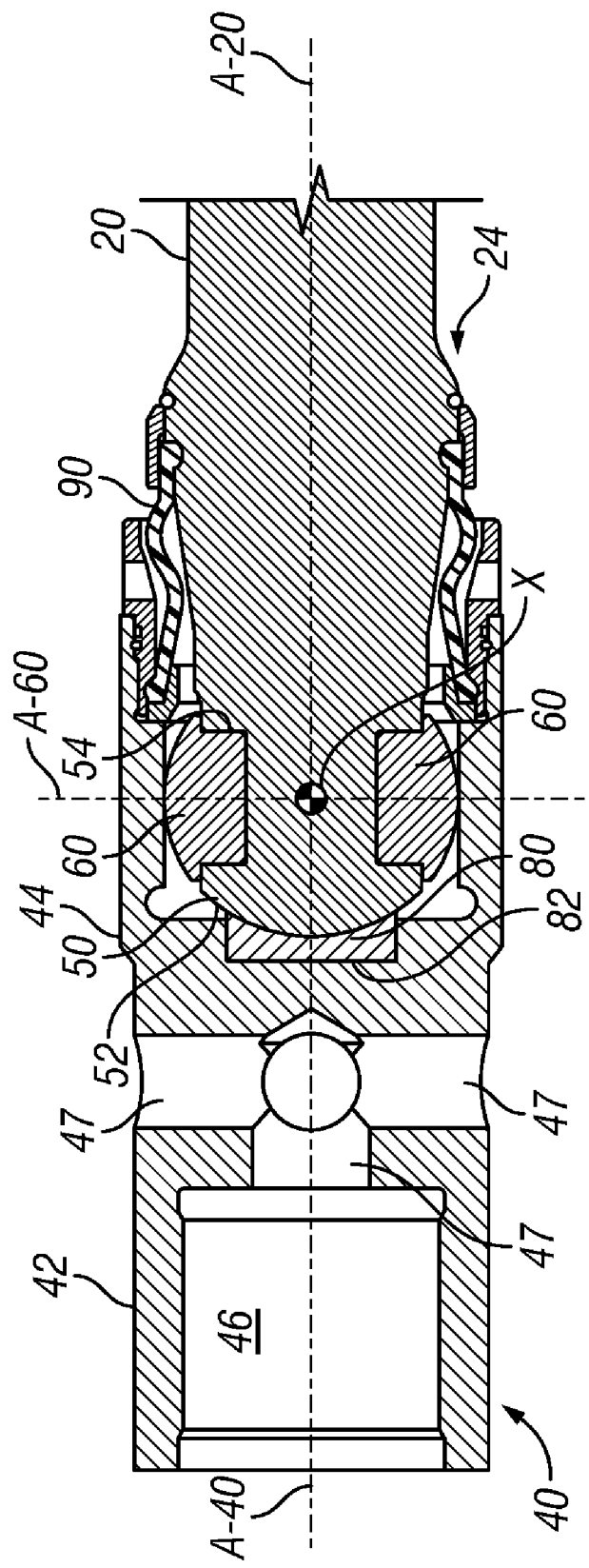
FIG. 2 is a cross-section through a first end of the drive shaft of FIG. 1 and its corresponding end housing, shown with the drive shaft and end housing in coaxial alignment.
Figure 3:
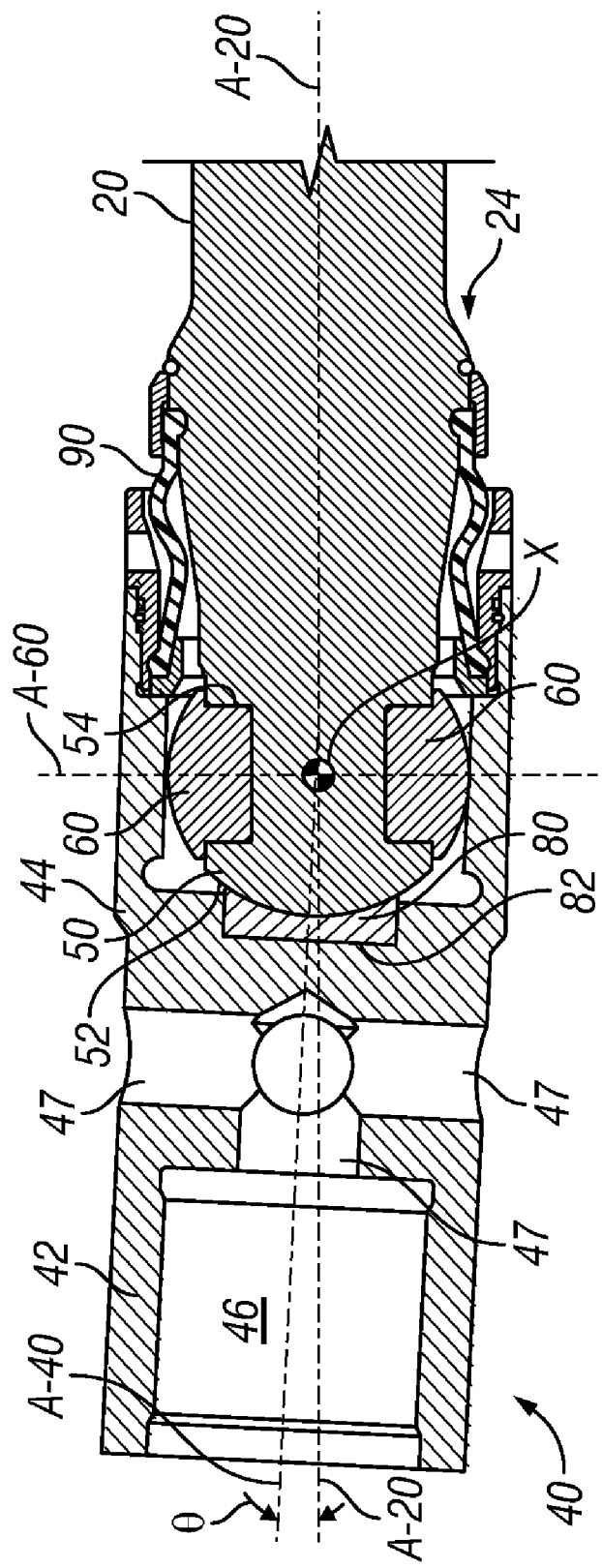
FIG. 3 is a cross-section as in FIG. 2, but with the drive shaft articulated relative to the end housing.
Figure 6:
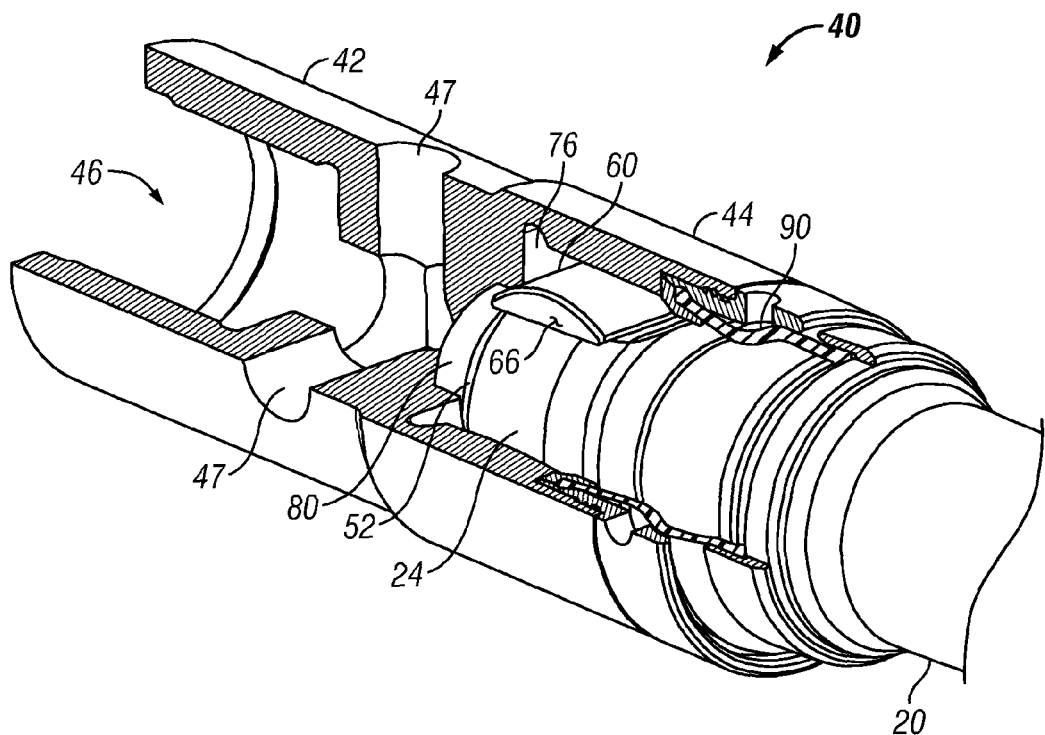
FIG. 6 is a partial cutaway perspective view of the drive shaft/end housing assembly of FIG. 2.
Figure 7:
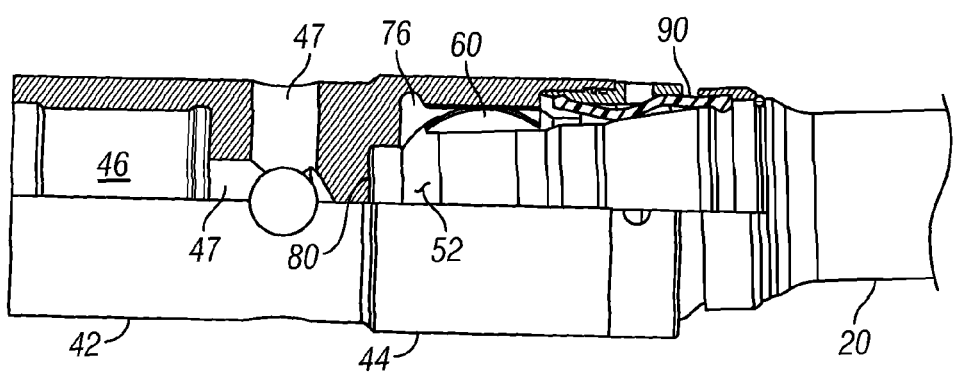
FIG. 7 is a partial cutaway side view of the drive shaft/end housing assembly as shown in FIG. 6.
Figure 8:
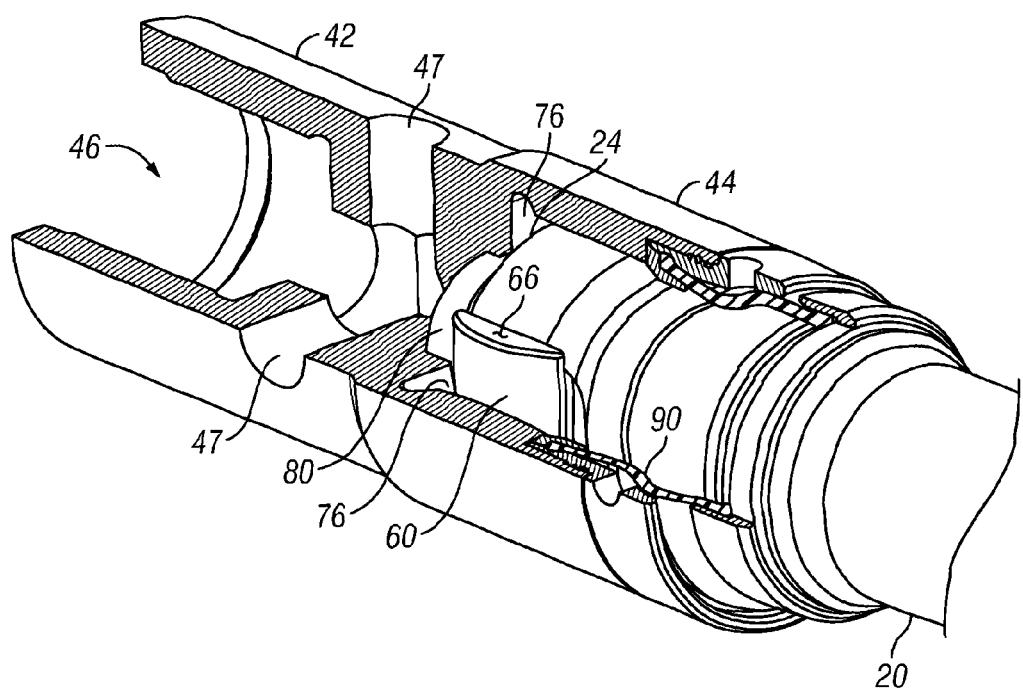
FIG. 8 is a partial cutaway perspective view of the drive shaft/end housing assembly of FIG. 2, rotated 90 degrees from the view of FIG. 6.
Figure 9:
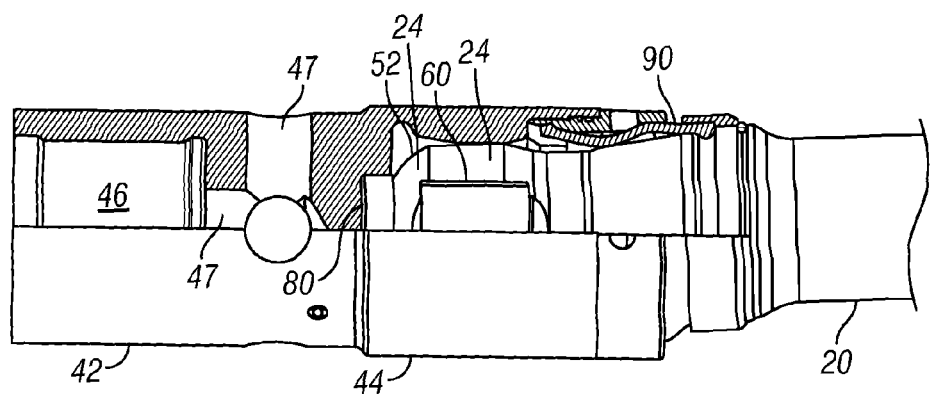
FIG. 9 is a partial cutaway side view of the drive shaft/end housing assembly as shown in FIG. 8.

In preferred embodiments, a concavely spherical bearing insert 80 may be incorporated into spherical bearing surface 74, as shown in FIGS. 2, 3, and 5, with bearing insert 80 disposed and secured as appropriate within a corresponding insert pocket 82 formed in base wall 71 of socket section 44 of end housing 40. Bearing insert 80 may be made from a different material than the main body of end housing 40, to allow the use of a particularly suitable or desirable material in areas subject to the greatest compressive contact pressures resulting from axial thrust loads, without needing to make the complete end housing out of that particular material. Bearing insert 80 preferably is made from or incorporates a material that will effectively reduce the coefficient of friction between bearing surfaces 52 and 74, and persons skilled in the art will readily appreciate that many known materials may be suitable for this purpose. Non-limiting examples of such materials would include bronze, bronze alloys, polyurethane, and PTFE (i.e., polytetrafluoroethylene/polytetrafluoroethene, or Teflon®).

In the assembled drive shaft assembly 10, the space within drive key slots 76 surrounding drive key heads 64 will typically and preferably be packed with a suitable lubricant, to facilitate swivelling of drive key shanks 62 within their respective drive key sockets 54, and to facilitate sliding movement of drive key end faces 66 along side faces 76B of drive key slots 76. Preferably, and as may be seen in FIGS. 2 and 3, a generally cylindrical closure boot 90 (made of rubber, neoprene, or other suitably flexible and chemically-resistant material) is disposed around the articulating juncture between drive shaft 20 and socket section 44 of end housing 40 to prevent drilling fluid from entering drive key slots 76 and contaminating the lubricant present therein. The ends of closure boot 90 may be fastened or anchored to drive shaft 20 and socket section 44 as appropriate, using any means and techniques known to persons skilled in the art. Closure boot 90 preferably has circumferential corrugations or is otherwise adapted to facilitate flexing of closure boot 90 in response to articulating movement of drive shaft 20 relative to end housing 40, while maintaining a proper seal to prevent ingress of drilling fluid into drive key slots 76. Although not illustrated or described in detail herein, retainer means will also be provided in association with the articulating juncture between drive shaft 20 and socket section 44 to prevent separation therebetween after initial assembly and during operation. Such retainer means may be provided in various forms using known technologies without departing from the scope of the present invention.

Although preferred embodiments of the drive shaft assembly of the present invention incorporate universal joint design and construction features in accordance with the foregoing descriptions at both ends of drive shaft 20, alternative embodiments may incorporate such features at one end of drive shaft 20 only, without departing from the scope of the invention.

It will be readily appreciated by those skilled in the art that various modifications of the present invention may be devised without departing from the essential concept of the invention, and all such modifications are intended to come within the scope of the present invention and the claims appended hereto. It is to be especially understood that the invention is not intended to be limited to illustrated embodiments, and that the substitution of a variant of a claimed element or feature, without any substantial resultant change in the working of the invention, will not constitute a departure from the scope of the invention.

In this patent document, the word "comprising" is used in its non-limiting sense to mean that items following that word are included, but items not specifically mentioned are not excluded. A reference to an element by the indefinite article "a" does not exclude the possibility that more than one of the element is present, unless the context clearly requires that there be one and only one such element.

As used in this patent document, relational terms and phrases such as "parallel", "perpendicular", "coincident", "intersecting", "equidistant", and "corresponding to" are not intended to denote or require absolute mathematical or geometrical precision. Accordingly, such terms are to be understood as denoting or requiring substantial precision (e.g., "substantially parallel") unless the context clearly requires otherwise.

What is claimed is:

1. A drive shaft assembly comprising:
   (a) a drive shaft having a first end, a second end, and a longitudinal rotational axis, said first end being formed with an integral, convexly spherical bearing surface extending radially inward on the first end to the longitudinal rotational axis of the drive shaft;
   (b) a first end housing having a longitudinal rotational axis, and having a concavely spherical bearing surface extending radially inward to the longitudinal rotational axis of the first end housing, wherein the spherical bearing surface mates and slidably engages with the convexly spherical bearing surface of the first end of the drive shaft; and
   (c) means for transferring torque from the drive shaft to the first end housing when the convex bearing surface of the first end of the drive shaft is in mating engagement with the concave bearing surface of the first end housing, said means for transferring torque configured to be operationally effective irrespective of any relative angular offset between the rotational axes of the drive shaft and the first end housing, within a selected angular range;
   wherein:
   (d) the means for transferring torque comprises a pair of first drive keys, each of the first drive keys having a drive key head, wherein the first drive keys are mounted to the drive shaft on opposite sides thereof, and are swivellable about a first swivel axis perpendicular to and passing through the rotational axis of the drive shaft;
   (e) each first drive key head has a planar end face;
   (f) the first end housing has a pair of first drive key slots, each of the first drive key slots having a side face oriented parallel to the rotational axis of the first end housing; and
   (g) each first drive key head is disposed within one of the first drive key slots, such that rotation of the drive shaft in a first rotational direction will urge the end face of each first drive key head into force-transferring contact against the side face of the corresponding first drive key slot, with each first drive key head being slidable within its corresponding first drive key slot to accommodate angular variances between the rotational axes of the drive shaft and the first end housing.

2. The drive shaft assembly of claim 1 wherein each drive key head incorporates a cylindrical shank swivellably disposed within a corresponding cylindrical shank socket in the drive shaft.

3. The drive shaft assembly of claim 1 wherein the concavely spherical bearing surface of the first end housing incorporates a bearing insert.

4. The drive shaft assembly of claim 3 wherein the bearing insert comprises a material selected from the group consisting of bronze, bronze alloys, polyurethane, and PFTE.

5. The drive shaft assembly of claim 1 wherein:
   (a) the means for transferring torque further comprises a pair of second drive keys each having a drive key head, said second drive keys being mounted to the drive shaft on opposite sides thereof and at right angles to the pair of first drive keys, so as to be swivellable about a second swivel axis perpendicular to and passing through the rotational axis of the drive shaft;
   (b) each second drive key head has a planar end face;
   (c) the first end housing has a pair of second drive key slots each having a side face oriented parallel to the rotational axis of the first end housing; and
   (d) each second drive key head is disposed within one of the second drive key slots, such that rotation of the drive shaft in said first rotational direction will urge the end face of each second drive key head into force-transferring contact against the side face of the corresponding second drive key slot, with each second drive key head being slidable within its corresponding second drive key slot to accommodate angular variances between the rotational axes of the drive shaft and the first end housing.

6. The drive shaft assembly of claim 1 wherein the second end of the drive shaft is formed with an integral, convexly spherical bearing surface, and further comprising:
   (a) a second end housing having a longitudinal rotational axis, and having a concavely spherical bearing surface configured for slidable mating engagement with the convexly spherical bearing surface of the second end of the drive shaft; and
   (b) means for transferring torque from the drive shaft to the second end housing when the convex bearing surface of the second end of the drive shaft is in mating engagement with the concave bearing surface of the second end housing, said means for transferring torque being operationally effective irrespective of any relative angular offset between the rotational axes of the drive shaft and the second end housing, within a selected angular range.

7. A drive shaft assembly comprising:
   (a) a drive shaft having a first end, a second end, and a longitudinal rotational axis, with a first convexly spherical bearing surface being formed on said first end of the drive shaft, and with the geometric centerpoint of said first convexly spherical bearing surface lying on the rotational axis of the drive shaft;
   (b) a first pair of primary drive keys, mounted to the first end of the drive shaft on opposite sides thereof and swivellable about a primary swivel axis perpendicular to and passing through the geometric centerpoint of the first convexly spherical bearing surface, with each primary drive key comprising a drive key head projecting outward of the drive shaft; and
   (c) a first end housing having a longitudinal rotational axis, a first end, a second end opposite the first end, a first cavity extending axially from the first end, and a second cavity extending axially from the second end, wherein the first cavity is not in fluid communication with the second cavity, and wherein the first cavity includes a concavely spherical bearing surface with a geometric centerpoint on the rotational axis of the first end housing, wherein the radius of said first concavely spherical bearing surface corresponding to the radius of the first convexly spherical bearing surface of the drive shaft, and wherein the first end housing includes a mud channel extending radially through the first end housing and in fluid communication with the second cavity;
   wherein:
   (d) each primary drive key head has a planar primary end face, said planar primary end face being parallel to the primary swivel axis;
   (e) the first end of the drive shaft is disposed within the first cavity of the first end housing with the first convexly spherical bearing surface of the drive shaft in slidable mating engagement with the concavely spherical bearing surface of the first end housing;
(f) the first end housing has a first pair of primary drive key slots positioned and configured to receive the primary drive key heads when the first convexly spherical bearing surface of the drive shaft is in mating engagement with the concavely spherical bearing surface of the first end housing;
(g) each primary drive key slot includes a planar primary side face, said primary side face being parallel to the rotational axis of the first end housing; and
(h) the length of each primary drive key slot in the direction of the rotational axis of the first end housing is greater than the length of the corresponding primary drive key head, such that each primary drive key head is slidable within its corresponding primary drive key slot;

such that:
(i) the drive shaft can be omnidirectionally articulated relative to the first end housing;
(j) rotation of the drive shaft in a first rotational direction will urge the primary end faces of the primary drive key heads into force-transferring contact against the primary side faces of the corresponding primary drive key slots, thereby transferring rotational torque between the drive shaft and the first end housing, with each primary drive key head being slidable within its corresponding primary drive key slot to accommodate angular variances between the longitudinal axes of the drive shaft and the first end housing, within a selected angular range; and
(k) axial thrust forces will be transferred between the drive shaft and the first end housing across the interface between the first convexly spherical bearing surface of the driveshaft and the concavely spherical bearing surface of the first end housing, irrespective of angular variances between the rotational axes of the drive shaft and the first end housing, within a selected angular range.

8. The drive shaft assembly of claim 7, wherein each primary drive key head incorporates a cylindrical shank swivellably disposed within a corresponding cylindrical shank socket in the drive shaft.

9. The drive shaft assembly of claim 7, further comprising a second pair of primary drive keys mounted to the drive shaft at right angles to the first pair of primary drive keys, said second pair of primary drive keys being slidingly engageable with a second pair of primary drive key slots formed in the first end housing.

10. The drive shaft assembly of claim 7 wherein the concavely spherical bearing surface of the first end housing incorporates a bearing insert.

11. The drive shaft assembly of claim 10 wherein the bearing insert comprises a material selected from the group consisting of bronze, bronze alloys, polyurethane, and PFTE.

12. The drive shaft assembly of claim 7, wherein a second convexly spherical bearing surface is formed on the second end of the drive shaft, said second convexly spherical bearing surface having a geometric centerpoint on the rotational axis of the drive shaft, and said assembly further comprising:
(a) a first pair of secondary drive key members, mounted to the second end of the drive shaft on opposite sides thereof and swivellable about a secondary swivel axis perpendicular to and passing through the centerpoint of the second convexly spherical bearing surface, with each secondary drive key comprising a drive key head projecting outward of the drive shaft; and
(b) a second end housing having a longitudinal rotational axis, and having a second concavely spherical bearing surface with a geometric centerpoint on the rotational axis of the second end housing, with the radius of said second concavely spherical bearing surface corresponding to the radius of the second convexly spherical bearing surface of the drive shaft;

wherein:
(c) each secondary drive key head has a planar secondary end face, said planar end face being parallel to the secondary swivel axis;
(d) the second end housing is configured to receive the second end of the drive shaft with the second convexly spherical bearing surface of the drive shaft in slidable mating engagement with the concavely spherical bearing surface of the second end housing;
(e) the second end housing has a first pair of secondary drive key slots positioned and configured to receive the first pair of secondary drive key heads when the second convexly spherical bearing surface of the drive shaft is in mating engagement with the concavely spherical bearing surface of the second end housing;
(f) each secondary drive key slot has a planar secondary side face, said secondary side face being parallel to the rotational axis of the second end housing; and
(g) the length of each secondary drive key slot in the direction of the rotational axis of the secondary end housing is greater than the length of the corresponding secondary drive key head, such that each secondary drive key head is slidable within its corresponding secondary drive key slot;

such that:
(h) the drive shaft can be omnidirectionally articulated relative to the second end housing;
(i) rotation of the drive shaft in said first rotational direction will urge the secondary end faces of the secondary drive key heads into force-transferring contact against the secondary side faces of the corresponding secondary drive key slots, thereby transferring rotational torque between the drive shaft and the second end housing, with each secondary drive key head being slidable within its corresponding secondary drive key slot to accommodate angular variances between the longitudinal axes of the drive shaft and the second end housing, within a selected angular range; and
(j) axial thrust forces will be transferred between the drive shaft and the second end housing across the interface between the second convexly spherical bearing surface of the driveshaft and the concavely spherical bearing surface of the second end housing, irrespective of rotation of the drive shaft relative to the second end housing, and irrespective of angular variances between the rotational axes of the drive shaft and the second end housing, within a selected angular range.

13. The drive shaft assembly of claim 12, further comprising a second pair of secondary drive keys mounted to the drive shaft at right angles to the first pair of secondary drive keys, said second pair of secondary drive keys being slidingly engageable with a second pair of secondary drive key slots formed in the second end housing.

14. A method for transferring an axial thrust load from an elongate first rotating member to a second rotating member, each rotating member having a rotational axis, and said method comprising the steps of:
(a) forming a convexly spherical surface on a first end of the first rotating member, with the geometric centerpoint of said convexly spherical surface lying on the rotational axis of the first rotational member, wherein the rotational axis of the first rotational member intersects the convexly spherical surface of the first end;
(b) forming the second rotating member with a concavely spherical surface, said concavely spherical surface having its geometric centerpoint lying on the rotational axis of the second rotational member and having a radius corresponding to the radius of the convexly spherical surface of the first rotating member, wherein the rotational axis of the second rotating member intersects the concavely spherical surface;
(c) assembling the first and second rotating members with the convexly spherical surface of the first rotating member in slidably mating engagement with the concavely spherical surface of the second rotating member, and with the geometric centerpoints of said convexly spherical and concavely spherical surfaces being coincident; and
(d) providing means for maintaining said convexly and concavely spherical surfaces in slidably mating engagement irrespective of any angular offset between the rotational axes of the first and second rotational members, within a selected angular range; and
(e) providing means for transferring torque from the first rotating member to the second rotating member irrespective of any angular offset between the rotational axes of the first and second rotational members;

wherein:
(f) the means for transferring torque comprises a pair of first drive keys each having a drive key head, said first drive keys being mounted to the first rotating member on opposite sides thereof, so as to be swivellable about a first swivel axis perpendicular to and passing through the rotational axis of the first rotating member;
(g) each first drive key head has a planar end face;
(h) the second rotating member has a pair of first drive key slots each having a side face oriented parallel to the rotational axis of the second rotating member; and
(i) each first drive key head is disposed within one of the first drive key slots, such that rotation of the first rotating member in a first rotational direction will urge the end face of each first drive key head into force-transferring contact against the side face of the corresponding first drive key slot, with each first drive key head being slidable within its corresponding first drive key slot to accommodate angular variances between the rotational axes of the first and second rotating members.

* * * * *